United States Patent [19]

Cross et al.

[11] Patent Number: 4,506,371
[45] Date of Patent: Mar. 19, 1985

[54] UNDERWATER THERMOMETER AND METHOD OF MAKING

[76] Inventors: Gregory L. Cross; Wendell C. Cross, both of 11413 W. 48th Ave., Wheatridge, Colo. 80033

[21] Appl. No.: 491,895

[22] Filed: May 5, 1983

[51] Int. Cl.³ .................. G01K 1/14; G01K 5/08; B32B 31/12; B65D 85/38
[52] U.S. Cl. .................. 374/136; 374/187; 374/190; 374/194; 374/201; 156/245; 156/247; 156/263; 156/299; 206/306
[58] Field of Search .............. 374/136, 187, 190, 191, 374/193, 194, 201, 208, 210; D10/60, 56–59; 156/245, 247, 263, 299, 256; 206/305, 306, 460, 811

[56] References Cited

U.S. PATENT DOCUMENTS

| | | | |
|---|---|---|---|
| D. 241,727 | 10/1976 | Barton | D10/60 |
| 342,222 | 5/1886 | Paull | 374/208 |
| 2,313,688 | 3/1943 | Wappner et al. | 374/191 |
| 2,783,172 | 2/1957 | Avery | 206/460 |
| 4,116,065 | 9/1978 | Jensen | 374/194 |

Primary Examiner—Charles Frankfort
Assistant Examiner—W. Morris Worth
Attorney, Agent, or Firm—Horace B. Van Valkenburgh; Jerry W. Berkstresser

[57] ABSTRACT

The underwater thermometer includes a transparent block, preferably formed of an acrylic plastic, having a planar rear surface provided with a longitudinal recess adapted to receive a fluid and tube type temperature indicator, with an enlargement at one end of the recess for receiving the bulb of the indicator. The indicator is adhesively attached to a foam pad, in turn adhesively secured to a flat, transparent layer, corresponding in shape to the planar rear surface of the block and adhered by a transparent adhesive, preferably an acrylic adhesive, to the rear surface of the block. The transparent layer is also provided, on its rear side, with one or more temperature scales and other indicia printed in reverse and visible through the transparent block, at least a portion of the front of which, such as the portion overlying the recess, is parallel to the planar rear surface. A second layer, preferably formed of a polyester plastic, but opaque, is adhered, as by an acrylic adhesive, to the rear side of the transparent layer. The transparent layer is adhered to the rear of the block by pressure, such as exerted by a roller, which squeezes out all air bubbles from the adhesive, the adhesive layer being thereby reduced to a thickness on the order of 0.001 inch. The opaque layer is similarly secured by adhesive and squeezing to the rear of the transparent layer. Each of the block and transparent and opaque layers may be provided at one end with a hole through which a cord is looped, for attachment of the underwater thermometer to the wrist or other portion of equipment of the user.

16 Claims, 13 Drawing Figures

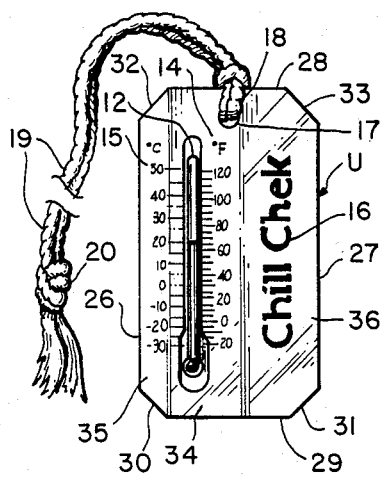
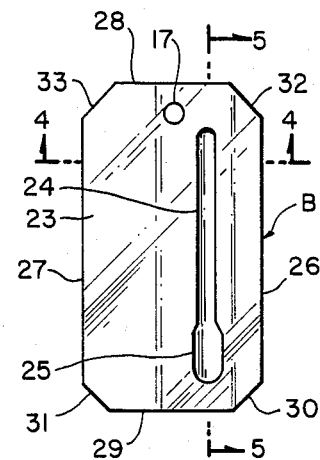
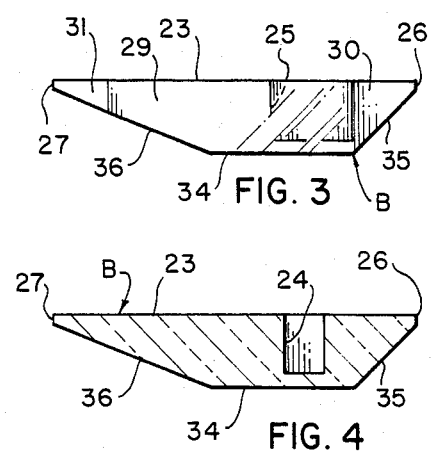
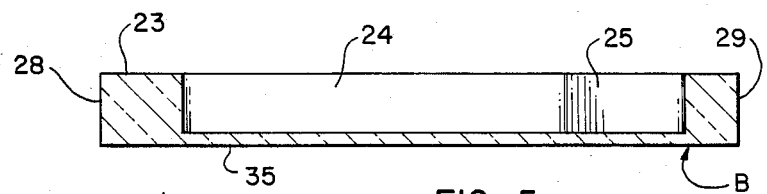
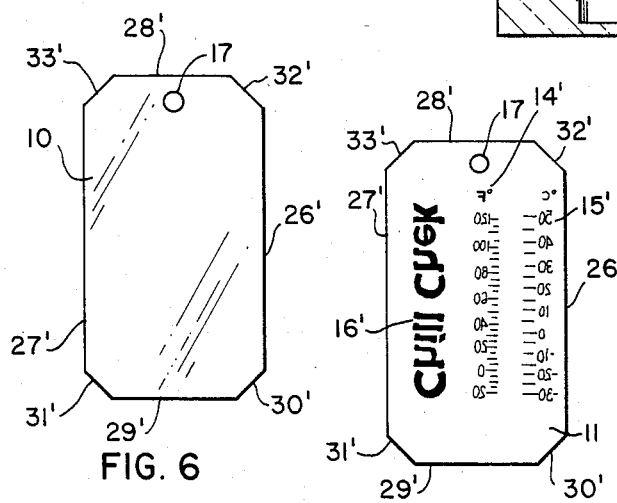
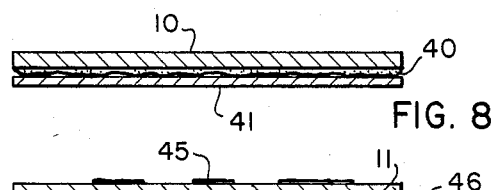
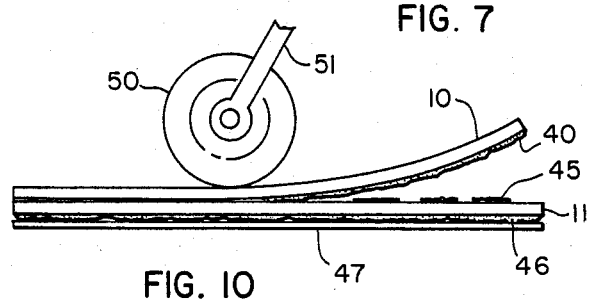
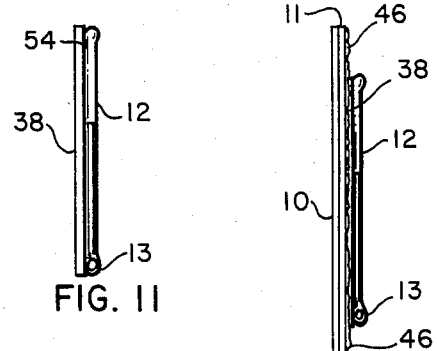
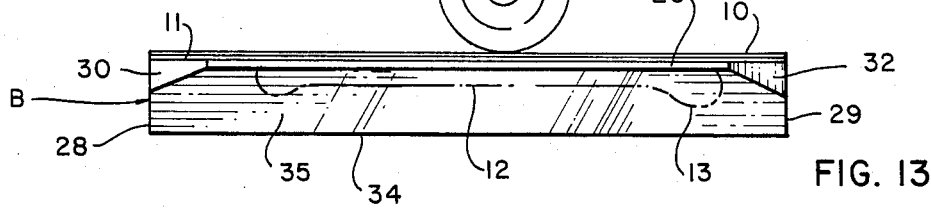

UNDERWATER THERMOMETER AND METHOD OF MAKING

This invention relates to underwater thermometers.

BACKGROUND OF THE INVENTION

Conventional underwater thermometers are based on a bimetallic coil which causes an indicator to move around a circular path, with the degrees of temperature indicated on a circular dial. Such thermometers are often made to be worn on a wrist band, in a manner similar to a wrist watch. While fluid and tube type thermometers are well known for other uses, as far as known, there is no underwater thermometer available on the market of this type.

Applicants have produced a thermometer for hikers, campers, and the like, utilizing the body of FIGS. 7-12 of U.S. Pat. No. Des. 241,727 by attaching a fluid and tube type thermometer to an opaque plastic layer and placing the layer in the generally rectangular recess of FIG. 12 of such design patent. This layer had °F. and °C. scales printed on the surface adjacent the thermometer which extended into the central slot of FIG. 12 of the aforesaid design patent, with the bulb in the enlargement shown. The rim around the recess was then heated to fuse with the layer and to seal all edges of the layer. This thermometer would withstand rain showers when attached to a jacket or other clothing of a user, but when immersed in water, would permit water to leak into the thermometer cavity, with the possibility of the thermometer becoming dislodged and inaccurate readings result.

Among the objects of this invention are to provide an underwater thermometer which will not only withstand prolonged immersion in water but also in water at pressures at depths to which divers with normal air tank equipment will go; to provide such an underwater thermometer which utilizes a fluid and tube type of indicator; to provide such an underwater thermometer which is light in weight and relatively inexpensive in cost; to provide such an underwater thermometer which is readily observed and the indication of the temperature readily seen against various backgrounds; to provide such an underwater thermometer which is light in weight and readily constructed; to provide such an underwater thermometer which may be formed from a readily moldable material, such as plastic, which is not only light in weight but transparent; and to provide such an underwater thermometer which is only relatively easy to produce but also effective and long lasting in use.

SUMMARY OF THE INVENTION

An underwater thermometer of this invention includes a transparent, molded plastic block similar to the block of FIGS. 10-12 of U.S. Pat. No. Des. 241,727, but with the rim of FIGS. 11 and 12 omitted to provide a flat surface across the rear of the block. A transparent layer provided with a transparent adhesive on one side and printing in reverse on the opposite side is adhered on the opposite side to the adhesive side of an opaque layer, each of the layers being cut to the shape of the rear of the transparent plastic block. The printing may include Farenheit and/or Centigrade thermometer scales, as well as indicia of origin. The transparent plastic block is provided with a recess or slot having an enlargement at one end and adapted to receive a fluid type thermometer having a capillary passage into which the fluid will expand or contract. The scale markings are spaced in proportion to the amount of expansion and contraction of the fluid. This thermometer is preferably adhered to a foam pad, which is adhered to transparent adhesive on the front side of the transparent layer in a position in which the thermometer will be received in the recess or slot and the bulb at one end will be received in the enlargement of the slot. The opaque layer is preferably adhered to the transparent layer by the transparent adhesive on the opaque layer, as by a roller exerting pressure against the rear side of the opaque layer, after which the foam pad is adhered to the adhesive on the front adhesive side of the transparent layer. The transparent layer is placed against the underside of the molded block and the pressure applied, again as by a roller, to cause any air bubbles or the like to be squeezed from the adhesive. A cord for attaching the underwater thermometer to a wrist of the user may be secured thereto, as by attachment at a hole in one end of the molded block and corresponding holes in the transparent and opaque layers. An acrylic plastic is preferred for the transparent molded block while a polyester plastic is suitable for the transparent and opaque layers.

THE DRAWINGS

FIG. 1 is a top plan view of an underwater thermometer constructed in accordance with this invention.

FIG. 2 is a bottom plan view of a transparent molded plastic body forming a portion of the underwater thermometer of FIG. 1.

FIG. 3 is an end view, on an enlarged scale, of the body of FIG. 2.

FIG. 4 is a transverse section, on an enlarged scale, taken along line 4—4 of FIG. 2.

FIG. 5 is a longitudinal section, on an enlarged scale, taken along line 5—5 of FIG. 2.

FIG. 6 is a plan view of an opaque layer, with pressure-sensitive adhesive on one side, which is adhered to the layer of FIG. 7, which is then adhered to the body of FIG. 2, so as to be disposed on the underside of the underwater thermometer of FIG. 1.

FIG. 7 is a plan view of a transparent layer with a transparent pressure-sensitive adhesive on one side, which is adhered to the underside of the body of FIG. 2, after being laminated to the layer of FIG. 6.

FIG. 8 is a longitudinal section of the layer of FIG. 6, equipped with an adhesive layer and a removable paper layer.

FIG. 9 is a longitudinal section, similar to FIG. 8, but of the layer of FIG. 7.

FIG. 10 is a side elevation, illustrating the preferred manner of adhering the layer of FIG. 7 to the layer of FIG. 6, the thickness of the layers being exaggerated for clarity of illustration.

FIG. 11 is a side view of a thermometer to which a foam pad has been attached by an adhesive.

FIG. 12 is a side elevation of an assembly formed by adhesively attaching the foam pad of FIG. 11 to the composite layers after completion of the step shown by FIG. 10.

FIG. 13 is a side elevation, on an enlarged scale, of the preferred manner of attaching the assembly of FIG. 12 to the body of FIG. 2 by an adhesive.

DESCRIPTION OF THE PREFERRED EMBODIMENT

An underwater thermometer U of FIG. 1 may be constructed, in accordance with this invention, from a transparent, molded plastic body B of FIGS. 2-5, an opaque layer 10 of FIG. 6, a transparent layer 11 of FIG. 7, together with a thermometer 12 having a bulb 13, each constructed and associated together in the manner described hereinafter. As shown, each layer 10 and 11, as well as the layers together, are relatively thin and flexible, with respect to the thickness and sturdiness of block B. Transparent layer 11 provides a column 14 by which the temperature in degrees F. may be indicated and a column 15 by which the temperature in degrees C. may be indicated, with the columns 14 and 15 being printed in reverse, on the underside of layer 11, as at 14' and 15' in FIG. 7, for a purpose referred to later. A legend 16 may be a trademark or other identifying indicia, also printed in reverse on the underside of transparent layer 11, as at 16' in FIG. 7, for a similar reason. Each of body B and layers 10 and 11 are provided with an aligned hole 17 which is adapted to receive a loop 18 of a doubled cord 19, whose ends are connected by a knot 20. The underwater thermometer may be attached so that a loop, formed by separating the double cords, may be placed around the wrist of a user or any other appropriate appendage or part of the user's attire, in order to attach the underwater thermometer to the user, so that it will be readily observable when knowledge of the temperature of the water is desired.

The transparent molded plastic body B of FIGS. 2-5, which may be similar in shape to the corresponding portion of the transparent thermometer cover of FIGS. 7-12 of U.S. Pat. No. Des. 241,727, may be provided with a planar surface 23, which is on the underside of the body, as viewed in FIG. 1. The surface 23 preferably is flat and smooth, as conveniently produced for attachment of the layers 10 and 11, as in the manner hereinafter described. A recess or slot 24, also at the rear of body B, accommodates the thermometer 12 and an enlargement 25 at one end of the slot 24 accommodates the bulb 13. The thermometer 12, as described below, is not fastened to the sides of the slot 24 or its enlargement 25, but merely extends into the slot 24 with the bulb 13 extending into the enlargement 25, as to the amount indicated in FIG. 13, in comparison with the extent of the slot 24 shown in FIG. 5. Sides 26 and 27 of the body are relatively narrow, as in FIGS. 3 and 4, while ends 28 and 29 extend generally the full depth of the body B, as in FIG. 5. The sides and ends are connected by angular corners 30, 31 at one end of body B and 32, 33 at the opposite end, the corners being disposed at 45° to sides 26 or 27 and ends 28 or 29. The corners are generally triangular in shape, as in FIG. 3, because of the configuration of the surface opposite planar surface 23, which includes a rectangular planar surface 34 which is smaller but parallel to surface 23 and on the front of the thermometer, as in FIG. 1. Also on the front of the thermometer are slanting or beveled surfaces 35 and 36, which differ in width but extend from front planar surface 34 to the side edges 26 and 27, respectively. Slanting or beveled surfaces 35 and 36 are disposed at different angles to the planar surface 34 and the side edges 26 and 27, due to their different widths, in turn due to the proximity of slot 24 to edge 26 and the consequently greater angle of surface 35 with respect to surface 34. In general, slot 24 is much closer to the side surface 26, so that both the thermometer 12 and the degree F. scale 14 are clearly visible through the surface 34, as in FIG. 1. However, the degree C. scale 15, adjacent the angular surface 36, is readily visible, since the prism effect provided by the angle between surfaces 34 and 36 tends to magnify the degree C. scale 15.

The body B may be formed from a suitable plastic, an acryllic plastic being preferred. Both the opaque layer 10 of FIG. 6 and the transparent layer 11 of FIG. 7 may be formed of strips of polyester plastic, with that utilized for the opaque layer 10 having a filler rendering it opaque. Each of the layers may be die-cut strips, to provide the hole 17 and the configuration shown in FIGS. 6 and 7, which corresponds to that of surface 23 of the body B, i.e. each layer having side edges 26' and 27', end edges 28' and 29' and corners 30', 31', 32' and 33', the latter being beveled at 45°. The opaque layer 10 of FIG. 6 forms the bottom layer of the underwater thermometer, while the transparent layer 11 of FIG. 7 is disposed between the layer 10 and surface 23 of body B. On the side to be placed opposite the surface 23 of body B, layer 11 is provided with reverse printing 14' of the degree F. scale and reverse printing 15' of the degree C. scale, with the legend 16' also being printed in reverse, each so that it will be visible in the appropriate position of the underwater thermometer, as in FIG. 1.

One of the necessary attributes of an underwater thermometer is that it must be leakproof, i.e. water entering the assembly and reaching the thermometer itself may cause the thermometer to be dislodged and move within its cavity to a position at which the temperature reading would be inaccurate. Also, the thermometer, if detached, could become turned over in position, so that its supporting pad 38 of FIG. 11 will prevent an accurate view of the position of the mercury or other measuring liquid within the thermometer. Applicants had attempted to utilize the body of FIGS. 7-12 of U.S. Pat. No. Des. 291,727, which the body B of this invention so closely resembles and which had been used successfully in producing a thermometer for hikers, campers and the like, which normally withstood rainstorms when attached to the outside of a jacket or other piece of clothing. Such a thermometer is produced by mounting a thermometer similar to thermometer 12 of the present application, on an opaque plastic layer corresponding in shape to the layers 10 and 11 of the present application, but smaller, i.e. also corresponding in shape to the recess bounded by the rim of FIGS. 11 and 12 of such design patent. This layer has 'F. and 'C. scales printed on it, with the thermometer positioned accurately relative to the scales and also positioned so that it would fit into the central slot shown in FIGS. 11 and 12 of such design patent, with its bulb in the enlargement at one end of such slot. The plastic layer was then placed in the recess and sealed in position by heating the rim referred to above, to fuse the rim to the edges of the plastic layer which thus produced a seal which would withstand rain which flowed down the thermometer; however, attempts to use such a thermometer for underwater purposes met with immediate failure. Actually, immersion of the prior thermometer in water would produce leakage into the thermometer cavity, as indicated previously, much less immersion to a depth of 150 ft. and the pressure present at such depth. As indicated, it was evident that some other seal for the thermometer should be utilized, if possible. Merely cementing the layer which held the thermometer proved to be insufficient and the method of the present invention was finally developed.

Layer 10, as in FIG. 8, is also provided with an adhesive layer 40, preferably an acrylic adhesive, as well as a paper layer 41, which is removed when the layer 10 is to be adhered to another layer. The preferred acrylic adhesive is obtained from Adhesive Research, Inc. of Glen Rock, Pa. and is supplied as No. AS-28. It is probable that other adhesives, particularly acrylic adhesives, will be compatible with an acrylic block and polyester layers, while adhesives compatible with blocks of other materials and layers of other materials may be used. Similarly, on the opposite side from the reverse printing characters 45, transparent layer 11 is provided with an adhesive layer 46, again preferably an acrylic adhesive, as well as a removable paper cover 47. As illustrated in FIG. 10, the paper cover 41 for adhesive layer 40 on opaque layer 10 is removed and the opaque layer adhered to the side of transparent layer 11 having the reverse printing symbols 45, as by placing the layer 11 on an appropriate surface and moving a roller 50 such as having a handle 51, along the layers until all air and the like are squeezed out from the adhesive and between the layers. The thermometer 12 may be attached to the assembly of the opaque layer 10 and the transparent layer 11 produced as described by adhering the thermometer to pad 38 of foam plastic of FIG. 11 through placing an adhesive layer 54 on one side of the foam pad and pushing the thermometer 12 against the adhesive layer 54. After adhesive layer 54 is set, the paper layer 47 of transparent layer 11, with layers 10 and 11, previously having been assembled, may be removed and the opposite side of the foam pad from the thermometer pressed against the exposed adhesive layer 46, as in FIG. 12. The foam pad 38 is attached at an appropriate position so that the readings of thermometer 12 will be accurate, on the scales 14 and 15 of FIG. 1. The body B is then placed on a suitable supporting surface, in the position of FIG. 13, and the assembly of FIG. 12 placed over the body B, with the thermometer 12 and its bulb 13 aligned with the slot 21 and its enlargement 22, respectively, and the sides, ends and corners of the body B. The plastic layer assembly then may be shifted downwardly on to the surface 23, with the adhesive layer 46 engaging the entire surface 23, but the cavity 24 and its enlargement 25 are not engaged. With the assembly of the layers 10 and 11 carrying the thermometer and the adhesive layer 46 of the assembly engaging the entire surface 23 of body B, the roller 50, as by its handle 51, is moved along the exposed surface of the opaque layer 10, with sufficient pressure to press the assembly firmly against the surface 23 and eliminate any air bubbles or the like from the adhesive 46. In order to squeeze air bubbles from beneath layer 11, after layers 10 and 11 have been attached and then placed on block B, using a roller 50 which exerts pressure against a very limited portion of the assembled layers 10 and 11, the assembly must be somewhat flexible. Thus, not only are the layers 10 and 11 relatively thin with respect to block B, the assembly of layers 10 and 11 are at least sufficiently flexible to bend as roller 50 passes over adjacent portions of the assembly. After the acrylic adhesive has solidified and has attached the layer 11 to the surface 23 of the acrylic body B, the underwater thermometer will be waterproof, to a considerable depth. Thus, such a thermometer has been tested to a water depth of 120 feet without leakage.

As indicated previously, although the thermometer for use by hikers, campers and the like, provided with an opaque plastic layer having the temperature scales and other indicia printed thereon, could withstand rainstorms and the like when this plastic layer was sealed by melting the peripheral rim shown in FIGS. 11 and 12 of U.S. Pat. No. Des. 291,727, it was found that such a seal was not sufficient for an underwater thermometer. Also, when the peripheral rim of the aforesaid FIGS. 11 and 12 was eliminated and a smooth, flat surface provided on the back of the molded plastic body, it was found that a sufficient adhesion of the layer to the body was insufficient to provide the desired seal. Since the printing, such as characters 45 of FIGS. 9 and 10, may be on the order of 0.002 inches thick, while the adhesive, when squeezed by pressure to eliminate air bubbles, may be on the order of 0.001 inches thick, a considerable number of indicia or characters may produce a weakness in the seal. It will be noted that the thickness of the characters 45 will be present in the adhesive layer 40 of FIG. 10 and a similar interference with the sealing effectiveness of this layer, at pressures up to those encountered at a water depth of 150 feet. It is surmised that, since the slot 24, in which the temperature indicator or thermometer 12 is located, is at one atmosphere pressure, the differential in pressure across the surface 23, particularly adjacent edge 26, as well as over other areas of surface 23, may be sufficient to disrupt the seal if characters 45 were placed against surface 23. On the other hand, there is not a similar pressure differential across layer 40, between layers 10 and 11, so that the seal of layer 40 is not disturbed by such pressure. Thus, it was concluded that, for best results, it would be necessary to utilize a transparent layer 11 with the indicia printed in reverse, on the opposite side of the layer from the adhesive, which became the rear side when this layer was installed. A sufficient seal could be produced, with the preferred adhesive using the roller and pressure technique described above, to withstand the water pressure corresponding to a depth of 150 feet. The opaque layer 10 provides a reflective background, which causes the scale to be more readily visible against a dark background as well as against a light background. Against a dark background, whatever light came through the surrounding water would tend to illuminate the scale, i.e. that passing through the transparent body B.

Although a preferred embodiment of this invention has been shown and described in detail, it will be understood that other embodiments may exist and variations may be made without departing from the spirit and scope of this invention.

What is claimed is:

1. An underwater thermometer capable of use to depths on the order of 150 feet, comprising:
    a transparent block having a planar rear surface provided with a longitudinal recess adapted to receive a fluid and tube type temperature indicator and a front surface through at least a portion of which said temperature indicator is visible;
    a transparent layer having a front surface adhesively secured to said planar rear surface of said block and adhesively securing said indicator in a position on said front surface so as to be within said recess of said block, said transparent layer having temperature measurement indicia correlated with said indicator printed in reverse on a rear surface of said transparent layer; and an opaque layer adhesively secured to said rear surface of said transparent layer.

2. An underwater thermometer, as defined in claim 1, wherein:
said transparent and opaque layers correspond in peripheral shape to said rear planar surface of said block.

3. An underwater thermometer, as defined in claim 1, wherein:
said transparent block is formed of an acrylic plastic.

4. An underwater thermometer, as defined in claim 3, wherein:
said transparent layer is formed of a polyester plastic; and
said opaque layer is formed of a polyester plastic provided with a filler.

5. An underwater thermometer as defined in claim 1, wherein:
said front surface includes a portion which is generally parallel to said rear surface over an area at least corresponding generally to the extent of said recess; and
said block tapers laterally and rearwardly at each side of said front parallel portion.

6. An underwater thermometer, as defined in claim 5, wherein:
said indicator has a bulb at one end; and
said recess in said block is provided with an enlargement at one end to accommodate said bulb.

7. An underwater thermometer as defined in claim 1, wherein:
said block is provided with means for attachment of said thermometer to a person using it.

8. An underwater thermometer as defined in claim 7, wherein:
said block and each of said layers are provided with aligned holes spaced from one end of said recess; and
a cord extends through said holes for attaching said thermometer to a person.

9. An underwater thermometer, comprising:
a transparent block having a planar rear surface provided with a longitudinal recess adapted to receive a fluid and tube type temperature indicator and a front surface through at least a portion of which said indicator is visible;
one side of a transparent layer carrying said indicator and secured by a transparent adhesive to said rear planar surface of said block, temperature measurement indicia being printed in reverse on a side of said transparent layer opposite said block;
an opaque layer adhesively secured to said opposite side of said transparent layer; and
said transparent layer being subjected, upon engagement of said adhesive with said planar surface, to pressure over consecutive portions of an area of said transparent layer engaging said planar surface, sufficient to squeeze air bubbles from said adhesive.

10. An underwater thermometer, as defined in 9, wherein:
said opaque layer is attached to said transparent layer prior to attachment of said transparent layer to said block; and
said opaque layer is subjected to pressure upon engagement of said adhesive of said opaque layer with said transparent layer, over consecutive portions of an area engaging said transparent layer and sufficient to squeeze air bubbles from said adhesive.

11. A method of producing an underwater thermometer, which comprises:
forming a transparent block having a planar rear surface provided with a longitudinal recess adapted to receive a fluid and tube type thermometer indicator and a front surface through which said indicator is visible;
providing one side of a transparent strip with a transparent adhesive and a protective covering for said adhesive, said strip being sufficiently large to be divided into a series of segments forming transparent layers corresponding in peripheral contour to said planar surface;
printing temperature measurement indicia in reverse, while said adhesive protective covering is present, on a side of said transparent strip opposite said one side in positions corresponding to the segments into which said strip is to be divided;
dividing said transparent strip and said protective covering into a plurality of segments forming transparent layers;
removing said protective covering for said adhesive from one said transparent layer and attaching said fluid and tube type indicator to said adhesive in a position corresponding to said recess of said block;
attaching said one transparent layer to said planar surface by engaging said adhesive of said one transparent layer with said planar surface and applying pressure over the opposite side of said one transparent layer sufficient to squeeze air bubbles out of said adhesive of said one transparent layer;
providing one side of an opaque strip with an adhesive and a protective cover for said adhesive, said opaque strip being sufficiently large to be divided into a series of opaque segments forming layers corresponding in peripheral contour to said planar surface;
dividing said opaque strip into a series of opaque segments forming layers corresponding in peripheral contour to said planar surface;
removing said protective cover from one of said opaque layers;
engaging the adhesive of said one opaque layer with said opposite side of said one transparent layer; and
applying pressure over substantially said entire opposite side of said one opaque layer sufficient to squeeze air bubbles from said adhesive of said one opaque layer.

12. A method as defined in claim 11, including:
adhesively securing said fluid and tube type temperature indicator to one surface of a foam plastic strip; and
engaging an opposite surface of said foam plastic strip with said adhesive on said transparent layer after removal of said cover but prior to engagement with said planar surface.

13. A method as defined in claim 12, which includes:
forming said block of an acrylic plastic;
forming said transparent strip of a polyester plastic; and
forming said opaque strip of a polyester plastic having a filler.

14. A method of producing an underwater thermometer, which comprises:
forming a transparent block having a planar rear surface provided with a longitudinal recess adapted to receive a fluid and tube type temperature indicator and a front surface through which said indicator is visible;

adhesively attaching a transparent layer by a transparent adhesive to said planar surface, said transparent layer carrying, on a side of said transparent layer attached to said block, said fluid and tube type temperature indicator so as to be positioned in said recess and having, on a side of the attached transparent layer opposite said block, temperature measurement indicia correlated with said indicator and printed in reverse; and adhesively attaching an opaque layer to said transparent layer.

15. A method as defined in claim 14, which includes:
adhesively attaching said opaque layer to said transparent layer and then adhesively attaching said transparent layer to said block.

16. A method as defined in claim 15, which includes:
producing pressure against consecutive areas of said opaque layer, while attaching said opaque layer to said transparent layer and while attaching said transparent and opaque layers to said block.

* * * * *